United States Patent
Fine

(10) Patent No.: US 6,203,819 B1
(45) Date of Patent: *Mar. 20, 2001

(54) DIETARY SUPPLEMENT AND METHOD OF TREATMENT FOR DIABETIC CONTROL

(75) Inventor: Stuart A. Fine, Northbrook, IL (US)

(73) Assignee: Akesis Pharmaceuticals, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,819

(22) Filed: Mar. 19, 1999

Related U.S. Application Data

(63) Continuation of application No. 08/964,814, filed on Nov. 5, 1997.
(60) Provisional application No. 60/039,958, filed on Mar. 7, 1997.

(51) Int. Cl.[7] .......................... A61K 33/26; A61K 33/24; A61K 33/14; A61K 31/60; A61K 31/355
(52) U.S. Cl. .......................... 424/646; 424/655; 424/681; 424/682; 514/165; 514/458
(58) Field of Search .................... 424/646, 655, 424/681, 682; 514/165, 458

(56) References Cited

U.S. PATENT DOCUMENTS

| | | | |
|---|---|---|---|
| Re. 33,988 | 7/1992 | Evans | 514/188 |
| 4,921,877 | 5/1990 | Cashmere et al. | 514/866 |
| 4,959,222 | 9/1990 | Nadland et al. | 424/692 |
| 5,013,752 | 5/1991 | Doblins | 514/505 |
| 5,045,316 | 9/1991 | Kaplan | 424/400 |
| 5,069,913 | 12/1991 | Posner et al. | 424/646 |
| 5,087,623 | 2/1992 | Boynton et al. | 514/188 |
| 5,087,624 | 2/1992 | Boynton et al. | 514/188 |
| 5,164,384 | 11/1992 | Paul | 514/188 |
| 5,215,750 | 6/1993 | Keane, II | 424/440 |
| 5,266,560 | 11/1993 | Furman et al. | 514/4 |
| 5,300,496 | 4/1994 | McNeill et al. | 514/186 |
| 5,308,627 | 5/1994 | Umbdenstock, Jr. | 424/639 |
| 5,332,579 | 7/1994 | Umbdenstock | 424/639 |
| 5,496,827 | 3/1996 | Patrick | 514/310 |
| 5,527,790 | 6/1996 | McNeill et al. | 514/186 |
| 5,532,269 | 7/1996 | Koltringer | 514/440 |
| 5,543,405 | 8/1996 | Keown et al. | 514/188 |
| 5,550,113 | 8/1996 | McNeill et al. | 514/54 |
| 5,597,585 | 1/1997 | Williams et al. | 424/579 |
| 5,599,835 | 2/1997 | Fisher | 514/440 |
| 5,614,224 * | 3/1997 | Womack . | |
| 5,620,967 | 4/1997 | McNeill et al. | 514/186 |
| 5,635,535 | 6/1997 | Wagstaff | 514/557 |
| 5,637,324 | 6/1997 | Bland | 424/655 |
| 5,641,561 | 6/1997 | Liebrecht et al. | 426/583 |
| 5,654,011 | 8/1997 | Jackson et al. | 424/635 |
| 5,665,385 | 9/1997 | Johnson et al. | 424/451 |
| 5,707,980 | 1/1998 | Knutson et al. | 514/167 |
| 5,730,988 | 3/1998 | Womack | 424/195.1 |
| 5,763,484 | 6/1998 | Horrobin | 514/560 |
| 5,770,215 * | 6/1998 | Moshyedi . | |
| 5,789,401 | 8/1998 | McCarty | 514/188 |
| 5,807,586 | 9/1998 | Jackson et al. | 424/630 |
| 5,817,329 | 10/1998 | Gardiner | 424/439 |
| 5,849,338 | 12/1998 | Richardson et al. | 424/682 |
| 5,866,563 | 2/1999 | McNeill et al. | 514/186 |
| 5,871,769 | 2/1999 | Fleming et al. | 424/423 |
| 5,905,075 | 5/1999 | Harpe et al. | 514/188 |
| 5,908,647 | 6/1999 | Golightly et al. | 426/74 |
| 5,962,030 | 10/1999 | Fine | 424/646 |
| 5,980,905 | 11/1999 | de la Harpe et al. | 424/195.1 |

FOREIGN PATENT DOCUMENTS

| | | |
|---|---|---|
| 298 05 782 U1 | 9/1998 | (DE) . |
| 0 561 744 A1 | 9/1993 | (EP) . |
| 0 834 318 A1 | 4/1998 | (EP) . |
| WO 91/11117 | 8/1991 | (WO) . |
| WO 96/25939 | 8/1996 | (WO) . |
| WO 96/35421 | 11/1996 | (WO) . |
| WO 96/39871 | 12/1996 | (WO) . |
| WO 97/11614 | 4/1997 | (WO) . |
| WO 98/04248 | 2/1998 | (WO) . |
| WO 98/41113 | 9/1998 | (WO) . |
| WO 98/42211 | 10/1998 | (WO) . |
| WO 99/07387 | 2/1999 | (WO) . |
| WO 00/12095 | 3/2000 | (WO) . |

OTHER PUBLICATIONS

Abbott et al., "The Impact of Diabetes on Survival Following Myocardial Infarction in Men vs Women", JAMA 260 (23): 3456–3460 (1988).

ACC/AHA Task Force Report, "Guideline for the Early Management of Patients With Acute Myocardial Infarction; A Report of the American College of Cardiology/American Heart Association Task Force on Assessment of Diagnostic and Therapeutic Cardiovascular Procedures (Subcommittee to Develop Guidelines for the Early Management of Patients With Acute Myocardial Infarction)" JACC 16 (2) :249–292 (1990).

Aharon, Y. et al.; "Vanadyl Sulfate Does Not Enhance Insulin Action in Patients With Type 1 Diabetes", Diabetes Care, 21 (12): 2194–2195, (Dec. 1998).

Amoikon, E. K. et al.; "Effect of Chromium Tripicolinate on Growth, Glucose Tolerance, Insulin Sensitivity, Plasma Metabolites, and Growth Hormone in Pigs", J. Anim. Sci. 73:1123–1130 (1995).

Anderson and Kozlovsky, "Chromium Intake, absorption and excretion of subjects consuming self–selected diets" The American Journal of Clinical Nutrition 41:1177–1183 (1985).

(List continued on next page.)

Primary Examiner—William R. A. Jarvis
(74) Attorney, Agent, or Firm—Foley, Hoag & Eliot

(57) ABSTRACT

A daily nutritional supplement and method of administering it to assist in the metabolism of glucose for patients with diabetes and pre-diabetes is disclosed. The supplement preferably includes anchor components of Chromium Polynicotinate and Picolinate, Vanadyl Sulfate, Vitamin E Natural, Standardized Willow Bark (aspirin), and Magnesium Chloride, Citrate, Fumarate, Malate, Glutorate, and Succinate Complex, Folic Acid, and Alpha-Lipoic Acid.

39 Claims, No Drawings

OTHER PUBLICATIONS

Anderson et al., "Elevated Intakes of Supplemental Chromium Improve Glucose and Insulin Variables in Individuals With Type 2 Diabetes", Diabetes 46:1786–1791 (1997).

Anderson et al., "Urinary Chromium excretion and insulinogenic properties of carbohydrates" AM. J. Clin. Nutr. 51:864–868 (1990).

Antiplatelet Trialists' Collaboration, "Collaborative overview of randomised trials of antiplatelet therapy–I: Prevention of death, myocardial infarction, and stroke by prolonged antiplatelet therapy in various categories of patients", BMJ 308: 81–106 (1994).

Arsenian, M.A., "Magnesium and the Autonomic Nervous System", Magnesium and Cardiovascular Disease 291–310 (1993).

Arsenian, M. A., "Magnesium and Cardiovascular Disease", Progres in Cardiovascular Disease 35 (4): 271–310 (1993).

Avins, "Lowering Risk without Lowering Cholesterol: Implication for National Cholesterol Policy", Annals of Internal Medicine 125(6): 502–506 (1996).

Bahadori et al., "Effect of Chromium Picolinate on Insulin Levels and Glucose Control in Obese Patients with Type –II Diabetes Mellitus" (1994).

Bailey, C. J., "Biguanides and NIDDM", Diabetes Care 15(6): 755–772 (1992).

Barnard et al., "Diet and Exercise in the Treatment of NIDDM: The need for Early emphasis" Diabetes Care 17(12):1469–1472 (1994).

Bayraktar, M. et al.; "A Comparison of Acarbose Versus Metformin as an Adjuvant Therapy in Sulfonylurea–Treated NIDDM Patients", Diabetes Care, 19(3): 252–254 (Mar. 1993).

Bierman, E. L., "Atherogeneis in Diabetes", Arteriosclerosis and Thrombosis 12(6): 647–656(1992).

Bloomgarden, Z. T., "American Diabetes Association Scientific Sessions, 1995; Magnesium Deficiency, Arteriosclerosis, and Health Care", Diabetes Care 18(12):1624–11627(1995).

Boyd, G. S. et al.; "Combined Dietary Chromium Picolinate Supplementation and an Exercise Program Leads to a Reduction of Serum Cholesterol and Insulin in Cllege–aged Subjects", J. Nutr. Biochem.9: 471–475 (1998).

Caballero, "Vitamin E Improves the Action of Insulin", Nutrition Reviews 51(11):339–340(1993).

Calle–Pascual, A. L. et al.; "Comparison Between Acarbose, Metform, and Insulin Treatment in Type 2 Diabetic Patients With Secondary Failure to Sulfonylurea Treatment", Diabete & Metabolisme(Paris) 21: 256–260 (1995).

Cam et al., "Long–term effectiveness of oral vanadyl sulphate in streptozotocin–diabetic rats", Diabetologia 36: 218–224 (1993).

Cerulli et al., "Chromium Picolinate Toxicity", The Annals of Pharmacotherapy 32:428–431, (Apr. 1998).

Chowdhury and Lasker, "Elevated glycated haemoglobin in non–diabetic patients is associated with an increased mortality in myocardial infarction", Postgrad. Med. J. 74: 480–481 (1998).

Clarke R. J., "Suppression of Thromboxane $A_2$ But Not of Systemic Prostacyclin By Controlled–Released Aspirin" The New England Journal of Medicine 325(16):1137–1141 (1991).

Classen, H. J., "Magnesium and Potassium Deprivation and Suppplementation in Animal and Man: Aspects in View of Intestinal Absorption", Magnesium 3: 257–264 (1984).

Cohen and Kitzes, "Magnesium Sulfate and Digitalis–Toxic Arrhythmias" JAMA 249 (20): 2808–2810 (1983).

Cohen et al., "Oral Vanadyl Sulfate Improves Hepatic and Peripheral Insulin Sensitivity in Patients with Non–Insulin–dependent Diabetes Mellitus", J. Clin Invest. 95: 2501–2509 (1995).

Colwell et al., "Correlation of Platelet aggregation, Plasma Factor Activity, and Megathrombocytes in Diabetic Subjects With and Without Vascular Disease", Metabolism 26(3): 279–285 (1977).

Dai et al., "One–year Treatment of Streptozotocin–Induced Diabetic Rats with Vanadly Sulphate" Pharmacology & Toxicology 74:101–109 (1994).

Davi, et al., "Thromboxane $B_2$ Formation and Platelet Sensitivity to Prostacyclin in Insulin–Dependent Diabetics" Thrombosis Research 26:359–370 (1992).

Davi, et al., "Thromboxane Biosynthesis and Platelet Function in Type II Diabetes Mellitus", The New England Journal of Medicine 322(25): 1769–1774(1990).

Davies, et al., "Intramiocardial Platelet Aggregation in Patients with unstable Angina Suffering Sudden Ischemic Cardiac Death" Circulation 73(3):418–427 (1986).

Davis, et al., "Monotherapy With Magnesium Increases Abnormally Low High Density Lipoprotein Cholesterol :A Clinical Assay", Current Therapeutic Research 36 (2): 341–346 (1984).

Defronzo and Ferrannini, "Insulin Resistance; A Multifaceted Syndrome Responsible for NIDDM, Obesity, Hypertension, Dyslipidemia, and Atherosclerotic Cardiovascular Disease", Diabetes Care 14(3):173–194(1991).

DeFronzo, A. R. et al.; "Efficacy of Metformin in Patients With Non–Insulin–Dependent Diabetes Mellitus", The New England Journal of Medicine 333(9): 541–549 (Aug. 31, 1995).

Dehghani et al., "Effect of Vanadyl Sulphate on Glucose Homeostasis in Severe Diabetes Induced by Streptozotocin in Rats", Indian J. Med Res. 106: 481–585 (1997).

De Tata, et al., "Beneficial Effects of the Oral Administration of Vanadyl Sulphate on Glucose Metabolism in Senescent Rats", Journal of Gerontology 48(5):B191–B195 (1993).

Diabetes Pro Health Inc., "Introducing A Nutritional Supplement Specifically Formulated For Adults With Diabetes & Pre–Diabetes" (1997).

Diabetes Pro Health Inc. "Pro Health Pak" (labels) Product (Label 1) described in label first sold no earlier than Jun. of 1997.

Diabetes Pro Health Inc. "Pro Health Pak" (Labels) Product (Label 2) described in label first sold no earlier than Jun. of 1997.

Diabetes Pro Health Inc. "Pro Health Pak" (Labels); Product described in label first sold no earlier than Mar. of 1998.

Diabetes Pro Health Inc. "Pro Health Pak" (Labels ); Product described in Label first sold no earlier than Oct. of 1999.

Diabetes Pro Health "Akesis Pharmaceuticals Inc". (Pamphlet) Product first used no earlier than Jun. of 1997.

Dieber–Rotheneder, et al., "Effect of Oral Supplementation with D–α–tocopherol on the vitamin e content of human low density lipoproteins and resistance to oxidation", Journal of Lipid Research 32: 1325–1332 (1991).

Domingo et al., "Administration of Vanadyl Sulfate by Gavage does not Normalize Blood Glucose Lvels in Streptozotocin–induced Diabetic Rats", Research Communications in Chemical Pathology and Pharmacology 75 (3) : 369–372 (Mar. 1992).

Domingo, J. L. et al.; "Tiron Administration Minimizes The Toxicity of Vanadate But not its Insulin Mimetic Properties in Diabetic Rats", Life Sciences 50(18): 1311–1317 (1992).

Donadio, et al., "Platelet–Inhibitor Treatment of Diabetic Nephropathy: A 10 Year Prospective Study", Mayo Clin. Proc. 63: 3–15 (1988).

Dubyak and Klainzeller, "The Insulin –mimetic Effects of Vanadate in Isolated Rat Adiopcytes", The Journal of Biological Chemistry 255(11):5306–5312 (1980).

E. B. Opkere et al., "Failure of oral metavanadate to correct streptozotocin–induced diabetes in rats", Diabetic Medicine Supplement 2 to vol. 5: A30 (p. 8) (1988) (Abstract).

ETDRS Investigators, "Aspirin Effects on Mortality and Morbidity in Patients with Diabetes Mellitus", JAMA 268(10): 1292–1300 (1992).

Evans and Pouchnik, "Composition and Biological Activity of Chromium –Pyridine Carboxylate Complexes", Journal of Inorganic Biochemistry 49 :177–187 (1993).

Evans and Bowman, "Chromium Picolinate Increases Membrane Fluidity and Rate of Insulin Internalization", Journal of Inorganic Biochemistry 46: 243–250 (1992).

Evans W. G., "The Effect of Chromium Picolinate on Insulin Controlled Parameters in Humans", Int. J. Biosocial Med. Research 11 (2) 163–180 (1980).

Ewald, et al., "Hypomagnesemia in Diabetic Children", Acta Padiatr Scand 72:367–371 (1983).

Expert Panel on Detection, Evaluation and Treatment of High Blood Cholesterol in Adults, "Summary of the Second Report of the National Cholesterol Education Program (NCEP) Expert Panel on Detection, Evaluation, and Treatment of High Blood Cholesterol in Adults (Adult Treatment Panel II) " JAMA 269(23):3015–3023 (1993).

Foot et al., "The Effects of Orthovanadate, Vanadyl and Peroxides of Vanadate on Glucose Metabolism in Skeletal Muscle Preparations in Vitro", Molecular and Cellular Biochemistry 109; 157–162 (1992).

Franz et al., "Nutrition Principles for the Management of Diabetes and Related Complications", Diabetes Care 17(5):490–518 (1994).

Freund, et al., "Chromium Deficiency During Total Parenteral Nutrition", JAMA 241(5):496–498 (1979).

Grant et al., "Chromium and Exercice Training: effect on obese women", Medicine & Science in Sports & Exercise, pp. 992–998 (1997).

Gunnar et al., "Recommendations for Angioplasty After Intravenous Thromobolysis", JAAC 16 (2):249–292 (1990).

Haffner, et al., "Cardiovascular Risk Factors in Confirmed Prediabetic Individuals; Does the Clock for Heart Disease Start Ticking Before the Onset of Clinical Diabetes?" JAMA 263 (21):2893–2898 (1990).

Haffner et al., "Propective Analysis of the Insulin– Resistance Syndrome (Syndrome X)" Diabetes 41: 715–722 (1992).

Halberstam, et al., "Oral Vanadyl Sulfate Improves Insulin Sensitivity in NIDDM but not in Obese Nondiabetic Subjects" Diabetes 45:659–666 (1996).

Harris, et al., "Onset of NIDDM Occurs at Least 4–7 Yr Before Clinical Diagnosis", Diabetes Care 15(7):815–819 (1992).

Hatwal,et al., "Association of Hypomagnesemia with Diabetic Retinopathy" Acta Ophthalmologica 67:714–716 (1989).

Heath, et al., "Platelet Adhesiveness and Aggregation in Relation to Diabetic Retinopathy", Diabetologia 7 : 308–315 (1971).

Hennekens, et al., "An Overview of the British and American Aspirin Studies", The New England Journal of Medicine 318(14):923–924 (1988).

Hermann, S. L. et al.; "Therapeutic Comparison of Metformin and Sulfonylurea, Alone and in Various Combinations", Diabetes Care 17(10): 1100–1109 (Oct. 1994).

Hirsh, et al., "Aspirin and Other Paltelet– Active Drugs; The Relationship Among Dose, Effectiveness, and Side Effects", Chest 108 (4):247S–257S (1995).

InterHealth Company., "Facts About Chromium Nutrition; Fact Sheet #1: The Importance of Niacin–Bound Chromium in Human Nutrition", (Jul. 21, 1992).

InterHealth Company., "Facts About Chromium Nutrition; Fact Sheet #2: Niacin–Bound Chromium Compounds Vary; ChromeMate's Oxygen– Coordinated Complex Found 18 Times More Potent", (Oct. 5, 1992).

InterHealth Company., "Facts About Chromium Nutrition; Fact Sheet#3: UC Study finds ChromeMate More Biovalaible than Chromium Picolinate, Chromium Choloride" (Oct. 14, 1992).

Jain, et al., "Some Metabolic Facets of Magnesium in Diabetes Mellitus", Jr. Asso. Phys. Ind 24:827–831 (1976).

Jarrett, et al., "The Bedford Survey: Ten Years Mortality Rates in Newly Diagnosed Diabetics, Borderline Diabetics and Normoglycaemic Controls and Risk Indices for Coronary Heart Disease in Borderline Diabetics" Diabetologia 22: 79–84 (1982).

Jeejeebhoy, "Chromium Deficiency, Glucose Intolerance, and Neuropathy reversed by Chromium Supplementation, in a Patient Receiving Long–term total Parenteral Nutrition", The American Journal of Clinical Nutrition 30: 531–538 (1977).

Joffres, et al., "Relationship of Magnesium intake and Other dietary factors to blood pressure: the Honolulu heart study", Am. J. Clin. Nutr. 45:469–475 (1987).

Julkunen–Tütto and Tahvanainen, "The Effect of the Sample Preparation Method of Extractable Phenolics of Salicaceae Species", Planta Medica 55: 55–61 (1989).

Kannel, W. B., "Lipids Diabetes, and Coronary Heart Disease: Insights from the Framingham Study" Am. Heart journal 110(5): 100–1107 (1985).

Kaplan, N. M., "The Deadly Quartet; Upper–Body Obesity, Glucose Intolerance, Hypertriglyceridemia, and Hypertension", Arch. Intern. Med. 149:1514–1520 (1989).

Klein, et al., "Visual Impairment in Diabetes", Ophthalmology 91(1):1–9 (1984).

Koskinen, et al., "Coronary Heart Disease Incidence in NIDDM Patients in the Helsinkski Heart Study" Diabetes Care 15 (7): 820–825 (1992).

Krolewski, et al., "Evolving Natural History of Coronary Artery Disease in Diabetes Mellitus", The American Journal of Medicine 90 (Suppl. 2A): 2A–56S–2A–61S (1991).

Krumholz, et al., "Aspirin for Secondary Prevention after Acute Myocardial Infarction in the Elderly: Prescribed Use and Outcomes", Ann. Intern. Med. 124: 292–298(1996).

Kushi, et al., "Dietary Antioxidant Vitamins and Death from Coronary Heart Disease in Postmenopausal Women" The New England Journal of Medicine 334(18):1156–1162 (1996).

Kuusisto, et al., "NIDDM and Its Metabolic Control Predict Coronary Heart Disease in Elderly Subjects", Diabetes 43:960–967 (1994).

Lee and Reasner, Beneficial Effect of Chromium Supplementation on Serum Triglyceride Levels in NIDDM: Diabetes Care 17 (12): 1449–1452 (1994).

Lee, et al., "Dose Effects of Aspirin on Gastric Prostaglandins Stomach Mucosal Injury", Annals of Internal Medicine 120(3): 184–189 (1994).

Lefavi et al., "Lipid– Lowering Effect of a Dietary Nicotinic Acid– Chromium(III) Complex in Male Athletes", The FASEB Journal, 5 (6) A1645 (1991) (Abstract).

Levin, et al., "Tissue Magnesium Status in Diabetes Mellitus", Diabetologia 21:131–134 (1981).

Liu and Morris, "Relative Chromium Response as an Indicator of Chromium Status", The American Journal of Clinical Nutrition 31 : 972–976 (1978).

Madan et al. "An Antiatherogenic role for folic acid in experimental Diabetes", J. Clin. Biochem. Nutr. 18(3):157–164 (1995).(Abstract).

Malabu et al., "Effects of Chronic Vanadate Administration in The STZ–Induced Diabetic Rat", Diabetes 43:9–15 (Jan. 1994).

Margolis, et al., "Clinical Features of Unrecognized Myocardial Infarction–Silent and Symptomatic; Eighteen Year Follow–up: The Framingham Study", The American Journal of Cardiology 32(1):1–7 (1973).

Marier, J. R. "Cardio–Protective Contribution of Hard Waters to Magnesium In–take", Rev. Can. Biol. 37(2):115–125 (1978).

Mather, et al., "Hypomagnesaemia in Diabetes", Clinica Chimica Acta 95:235–242 (1972).

McCarty, F. M. "Complementary Measures for Promoting Insulin Sensitivity in Skeletal Muscle", Medical Hypotheses 51 :451–464 (1998).

McNair, et al., "Hypomagnesemia, a Risk Factor in Diabetic Retinopathy" Diabetes 27:1075–1077 (1978).

McNair, et al., "Renal Hypomagnesaemia in Human Diabetes Mellitus: its relation to glucose homeostasis" European Journal of Clinical Investigation 12:81–85 (1982).

McNeill, et al., "Oral Vanadium and Lowering of Blood Glucose" Diabetes 43:1268– (1994).

McPhillips, et al., "Carciovascular Disease Risk Factors Prior to the Diagnosis of Impaired Glucose Tolerance and Non–Insulin–Dependent Diabetes Mellitus in a Community of Older Adults", American Journal of Epidemiology 131 (3):443–453 (1990).

Meinert, et al., "Mortality Results; A Study of the Effects of Hypoglycemic Agents on Vascular Complications in Patients with Adult–Onset Diabetes" The University Group Diabetes Program Chptr II: 786–830 (1961).

Mertz, W. "Effects and Metabolism of Glucose Tolerance Factor" Nutrition Reviews 33:(5): 129–135(1961).

Mongold, et al., "Toxicological Aspects of Vanadyl Sulphate on Diabetic Rats: Effects on Vanadium Levels and Pancreatic B–Cell Morphology" Pharmacology & Toxicology 67:192–198 (1990).

Mooradian, A. D., "Selected Vitamins and Mineral in Diabetes", Diabetes Care 17:(5): 464–479 (1994).

Moore and Friedl, "Physiology of Nutritional Supplements: Chromium Picolinate and Vanadyl Sulfate", National Strength and Conditioning Association Journal 14:(3) 47–48 (1992).

Morris, et al., "Correlations Between Abnormalities In Chromium and Glucose Metabolism In a Group of Diabetics", Clinical Chemistry 34(7): 1525–1526 (1988).

Morris, et al., "Effects of Glucose Loading on Concentrations of Chromium in Plasma and Urine of Healthy Adults" Clinical Chemistry 34(6): 1114–1116(1988).

Morris, et al., "Plasma Chromium and Chromium Excretion in Diabetes", Clinical Chemistry 31: (2):334–335 (1985).

Nadler, et al., "Intracellular Free Magnesium Deficiency Plays a key Role in Increased Platelet Reactivity in Type II Diabetes Mellitus" Diabetes Care 15 (7):835–841 (1992).

Newman, et al., "Serum Chromium and Angiographically Determined Coronary Artery Disease", Clin. Chem. 24 (4):451–544 (1978).

Offenbacher and Pi–Sunyer, "Beneficial Effect of Chromium–rich Yeast on Glucose Tolerance and Blood Lipids in Elderly subjects", Diabetes 29: 919–925 (1980).

Olin et al., "Comparative Retention/Absorption of Chromium (Cr) from Cr Chloride(CrCl), Cr Nicotinate (CrNic), and Cr Picolinate (CrPic) in a Rat model", (Reprint of Abstract and Data Presented at $33^{rd}$ Annual Meeting of the American College of Nutrition, Oct. 10, 1992).

Orchard and Strandness, "Assessment of Peripheral Vascular Disease in Diabetes", Circulation 88 (2):819–828 (1993).

Pagano, G. et al.; "Metformin Reduces Insulin Requirement in Type1 (Insulin–Dependent) Diabetes", Diabetologia 24: 351–354 (1983).

Paolisso et al., "Dietary Magnesium Supplements improve B–cell response to glucose and arginine in Elderly non–insulin dependent diabetic subjects" Acta Endocrinologica 121: 16–20 (1989).

Paolisso et al., "Daily Vitamin E Supplements Improve Metabolic Control But Not Insulin Secretion in Elderly Type II Diabetic Patients", Diabetic Care 16(11):1434–1437(1993).

Paolisso, et al., Improve Insulin Response and Action by Chronic Magnesium Administration in Aged NIDDM Subjects, Diabetes Care 12(4):265–269 (1989).

Paolisso, et al., "Magnesium and Glucose Homeostasis", Diabetologia 33: 511–514 (1990).

Paolisso, et al., Pharmacologic Doses of Vitamin E improve Insulin Action in healthy subjects and non–insulin dependent diabetic patients, Am. J. Clin. Nutr 57:650–656 (1993).

Perfetti, R. et al. ;Novel Therapeutic Strategies for the Treatment of Type 2 Diabetes, Diabetes/Metabolsim Reviews 14 : 207–225 (1998).

Potter, et al., Glucose Metabolismin Glucose –Intolerant Older People During Chromium Supplementation Metabolism 34 (3):199–204 (1985).

Press, et al., "The Effect of Chromium Picolinate on Serum Cholesterol and Apolipoprotein Fraction in Human Subjects" West J. of Med. 152: 41–45 (1990).

Preuss et al., "Effects of Different Chromium Compounds on Blood Pressure and Lipid Peroxidation in Spontaneously Hypertensive Rats", Clinical Nephrology 47(5) 325–330 (1997).

Ravina et al., "Clinical Use of the Trace Element Chromium (III) in the Treatment of Diabetes Mellitus", The Journal of Trace Elements in Experimental Medicine 8:183–190 (1995).

Ravina, A. et al.; "Reversal of Corticosteroid–induced Diabetes Mellitis With Supplemental Chromium", Diabetic Medicine 16 :164–167 (1999).

Reaven, G. M., "Role of Insulin Resistance in Human Disease", Diabetes 37:1595–1607 (1988).

Reinhart, R. A., "Magnesium Metabolism; A Review With Special Reference to the Relationship Between Intracellular Content and Serum Levels", Arch. Intern. Med. 148: 2415–2420 (1988).

Resnick, et al., "Hypertension and Peripheral Insulin Resistance; Possible Mediating Role of Intracellular Free Magnesium", The American Journal of Hypertension 3 (5)(Part 1):373–379 (1990).

Resnick, L. M., "Cellular Calcium and Magnesium Metabolism in the Pathophysiology and Treatment of Hypertension and Related Metabolic Disorders", The American Journal of Medicine 93 (Suppl. 2A): 2A–11S 2A–20S(1992).

Rimm, et al., "Vitamin E and Risk of Coronary Heart Disease in Men" The New England Journal of Medicine 328 (20):1453–1456 (1993).

Roeback, et al., "Effects of Chromium Supplementation on Serum High–Density Lipoprotein Cholesterol Levels in Men Taking Beta–Blockers" Annals of Internal Medicine 115 (12): 917–924 (1991).

Rubin, et al., "Health Care Expenditures for People with Diabetes Mellitus, 1992", Journal of Clinical Endocrinology and Metabolism 78(4):809A–809F (1994).

Rude, R. K., "Physiology of Magnesium Metabolism and the Important Role of Magnesium in Potassium Deficiency", The American Journal of Cardiology 63: 31G–34G (1989).

Ryzen, et al., "Low Blood Mononuclear Cell Magnesium in Intensive Cardiac Care Unit Patients", American Heart Journal 111: 475–480(1986).

Saad, et al., "Sequential Changes in Serum Insulin Concentration During Development of Non– Insulin–Dependent Diabetes", The Lancet pp. 1356–1359 (1989).

Salonen, et al., "Increased Risk of Non–Insulin Dependent Diabetes Mellitus at Low Plasma vitamin E concentrations: a four year follow up study in men" BMJ 311:1124–1127 (1995).

Saltiel and Olefsky, "Thiazolidinediones in the Treatment of Insulin Resistance and Type II Diabetes", Diabetes 45:1661–1669 (1996).

Seelig and Heggtveit, "Magnesium Interrelationships in Ischemic heart disease : a review", The American Journal of Clinical Nutrition 27: 59–79 (1974).

Seelig, M., "Cardiovascular Consequences of magnesium Deficiency and Loss: Pathogenesis, Prevalence and Manifestations–Magnesium and Chloride Loss in Refractory Potassium Repletion", The American Journal of Cardiology 63: 4G–21G (1989).

Sjögren, et al., "Magnesium, Potassium and Zinc Deficiency in Subjects with Type II Diabetes Mellitus", Acta Med Scand 224: 461–465 (1988).

Sjögren, et al., "Oral Administration of Magnesium Hydroxide to Subjects with Insulin– Dependent Diabetes mellitus: Effects on Magnesium and Potassium Levels and on Insulin Requirements", Magnesium 7:117–122 (1988).

Spears, W. J. ;"Reevaluation of the Metabolic Essentiality of the Minerals", Presented at Symposium I entitled"New Technologies for the Production of next Generation Feedsand Additives" of the 8th World Conference on Animal Production on Jun. 30, 1998 at Seoul National University, Seoul, Korea, pp. 1002–1008 (Jun. 30, 1998).

Stamler, et al., "Diabetes, Other Risk Factors, and 12–Yr Cardiovascular Mortality for Men Screened in the Multiple Risk Factor Intervention Trial" Diabetes Care 16(2):434–444 (1993).

Stampfer, et al., "Vitamin E Consumption and the Risk of Coronary Disease in Women" The New England Journal of Medicine 328 (20): 1444–1449 (1993).

Stearns et al., "Chromium (III) picolinate produces chromosome damage in Chinese hamster ovary cells [1]", The FASEB Journal 9:1643–1649 (Dec. 1995).

Steinberg, et al., "Antioxidants in the Prevention of Human Atherosclerosis" Circulation 85 (6): 2337–2345 (1992).

Steinberg, et al., "Beyond Cholesterol; Modifications of Low– Density Lipoprotein That Increase Its Atherogenicity" The New England Journal of Medicine 320(14):915–924 (1989).

Stephens, et al., "Randomised Controlled Trial of Vitamin E in the Patients with Coronary Disease: Cambridge Heart Antioxidant Study (Chaos)" The Lancet 347:781–786 (1996).

Stewart and Basten, "Lupus Erythematosus and Brain Scanning" Annals of Internal Medicine 83(5):733–738 (1975).

The RISC Group, "Medical Science; Risk of Myocardial Infarction and Death During Treatment with low Dose Aspirin and Intravenous heparin in men with unstable coronary artery disease" The Lancet 336 : 827–830 (1990).

The Salt Collaborative Group, "Swedish Aspirin Low–dose Trial(Salt) of 75 mg aspirin as secondary prophylaxis after cerebrovascular ischaemic events", The Lancet 338(8779):1345–1349 (1991).

Thomas and Gropper,. "Effect of Chromium Nicotinic Acid Supplementation on Selected Cardiovascular Disease Risk Factors", Biological Trace Element Research 55(3): 297–305 (1996).

Thompson, et al., "Studies of Vanadyl Sulfate as a Glucose–Lowering Agent in STZ–Diabetic Rats", Biochemical and Biophysical Research Communications 197(3):1549–1555 (1993).

Tomlinson,. "Future Prevention and Treatment of Diabetic Neuropathy", Diabetes & Metabolism(Paris)24 (Suppl. 3) :79–83 (1998).

Tosiello, L., "Hypomagnesemia and Diabetes Mellitus" arch Intern. Med. 156:1143–1148 (1996).

Trip, et al., "Platelet Hyperreactivity and Prognosis in Survivors of myocardial Infarction", The New England Journal of medicine 322 (22):1549–1554 (1990).

Tuman and Doisy, "Metabolic Effects of the Glucose Tolerance Factor(GTF) in Normal and Genetically Diabetic Mice" Diabetes 26 (9):820–826(1977).

United Kindom Prospective Diabetes Study Group, "United Kingdom Prospective Diabetes Study (UKPDS) 13: relative efficacy of randomly allocated diet, sulphonylurea, insulin, or metform in patients with newly diagnosed non–insulin dependent diabetes followed for three years" BMJ 310:83–88 (1995).

Urberg et al., "Hypocholesterolemic Effects of Nicotinic Acid and Chromium Supplementation", The Journal of Family Practice 27:(6) 603–606 (1988).

Urberg and Zemel., "Evidence for Synergism Between Chromium and Nicotinic Acid in the Control of Glucose Tolerance in Elderly Humans", Metabolism 36(9): 896–899 (Sep. 1987).

Verlangieri and Bush, "Effects of d–α–Tocopherol Supplementation on Experimentally Induced Primate Atherosclerosis", Journal of the American College of Nutrition 11 (2): 131–138 (1992).

Walter et al., "The Effect of Oral Chromium Picolinate on Glycemic Responses and Lipid Profiles in Patients with Type II Diabetes Mellitus", Diabetes 42 (Suppl.) :146(May 1993).

Whang, R., "Magnesium Deficiency: Pathogenesis, Prevalence, and Clinical Implications", The American Journal of Medicine 82(Suppl. 3A):24–29 (1987).

Widman, "The Dose –Dependent Reduction in Blood Pressure Through Administration of Magnesium; A Double Blind Placebo Controlled Cross–Over Study", The American Journal of Hypertension, Inc. 6: 41–45 (1993).

Wilson and Gondy., "Effects of Chromium Supplementation on Fasting Insulin Levels and Lipid Parameters in Healthy, Non–obese Young Subjects", Diabetes Research and Clinical Practice 28: 179–184 (1995).

Woods and Fletcher, "Long–term outcome after intravenous magnesium sulphate in suspected acute myocardial infarction: the second Lelcester Intravenous Magnesium Intervention Trial (Limit–2)" The Lancet 343:816–819 (1994).

Woolliscroft and Barbose, "Analysis of Chromium Induced Carbohydrate Intolerance in the Rat", J. Nutr. 107:1702–1706 (1977).

Ziegler et al., "Treatment of Symptomatic Diabetic Peripheral Neuropathy with the anti– oxidant α– lipoic acid", Diabetologia 38 : 1425–1433 (1995).

C A, 120:235867, PP.80 (1994); Verma et al.

C A, 123: 282513, Pote et al. (1995).

C A, 124 :194034, Ziegler et al. (1995).

C A, 127: 199538, Haupt et al. (1997).

C A, 127: 257401, Mark et al. (1997).

C A, 128:12817, Anderson et al. (1997).

"Chromium Picolinate for HGood Health?, ", Biolifephus-.com, Online! Oct. 16, 1999, XP002135607, www.chromium.html, retrieved on Apr. 5, 2000.

* cited by examiner

US 6,203,819 B1

DIETARY SUPPLEMENT AND METHOD OF TREATMENT FOR DIABETIC CONTROL

This application is a continuation of application Ser. No. 08/964,814, filed Nov. 5, 1997, which claims the benefit of priority to Provisional Application 60/039,958, filed Mar. 7, 1997.

BACKGROUND OF THE INVENTION

The present invention is related to a unique vitamin, mineral, and herbal supplement for the treatment of both type I and II diabetes, and for the prevention of type II diabetes in those individuals with pre-diabetes, or impaired glucose tolerance (IGT). Specifically, the present invention is directed towards a dietary supplement for diabetic control containing a plurality of compounds from the following group: Vanadyl sulfate, Chromium polynicotinate and picolinate, Magnesium chloride, citrate, fumarate, malate, glutorate, and succinate complex, Natural Vitamin E (free 2'R, 4'R, 8'R-alpha tocopherol), Standardized Willow Bark (aspirin), Alpha-lipoic acid, and Folic acid.

Diabetes has become a leading health care issue in the United States and other industrialized countries, accounting for one seventh of the entire national health care product. The incidence of diagnosed diabetes has increased five-fold in America over the past 35 years, with currently 8 million diagnosed diabetic patients, another estimated 8 to 12 million undiagnosed diabetic individuals, and still an additional 23 million Americans with pre-diabetes, or impaired glucose tolerance (IGT). As the American populace continues its strong trend towards aging, obesity and greater minority representation, the increasing rate of diagnosed diabetes is certain to continue.

The tremendous economic and physical toll diabetes extracts from society is, in large part, secondary to both the short and long-term complications of the disease. While there have been great strides made in reducing the short term complications of diabetes, e.g. ketoacidosis, dehydration, and non-ketotic hyperosmolar coma, little, if any, headway has been made in preventing or even minimizing the devastating chronic complications of the disease, e.g. premature atherosclerosis, retinopathy, nephropathy, and neuropathy. Indeed, diabetes has become the leading cause of new cases of blindness in adults in the United States, and now accounts for over a third of all new cases of end-stage renal disease in this country. It is estimated that a diabetic patient's life is shortened by 10 to 15 years, and those years of life are distinguished by a health care tab four times that of a non-diabetic patient.

Diabetes is a major cardiovascular risk factor, especially among women. This increased risk factor in women is a fact lost by many in both the medical and lay communities. Indeed, a man's risk of dying by heart disease doubles when he develops diabetes, but a woman's risk increases three to five-fold the day she is found to have diabetes. The failure to reduce this increased risk for heart disease over the last eight decades of diabetes management is a painful reminder that our current interventions, while having the potential for more favorable impact, are woefully inadequate.

Type II diabetes [(i.e. maturity onset)], which accounts for 95% of diabetes, is far more than just a state of abnormal glucose metabolism, but is rather a milieu of co-existent cardiovascular metabolic risk factors, i.e. insulin resistance, hyperinsulinemia, central obesity, hypertriglyceridemia, low HDL level and elevated blood pressure: a state recently identified as Syndrome X. Much of the excessive cardiovascular morbidity and mortality associated with diabetes is secondary to this array of cardiovascular risk factors, which precede the onset of diabetes by as much as a decade and may explain the presence of overt clinical cardiovascular disease in as many as 60% of newly diagnosed diabetic patients.

However, at least one study revealed an excessive risk of cardiac mortality in diabetic patients even after adjusting for the co-existence of other cardiovascular risk factors such as hypertension, dyslipidemia and cigarette smoking. The inventor of the present invention has popularized the term "dead zone of diabetes" to describe this phenomenon of increased cardiovascular risk even after allowing for the co-existence of other risk factors in diabetes. This 'dead zone" is secondary to both the atherogenicity of insulin resistance, which precedes the onset of diabetes by at least 8 years, and the atherogenicity of undiagnosed and uncontrolled hyperglycemia, which is present for 9–12 years before diabetes is first diagnosed. Treatment of diabetes, and its related chronic symptoms and risk factors, are best treated at this early stage.

SCOPE AND CONTENT OF THE PRIOR ART

If the medical community is to have any success in attenuating the cardiovascular ravages of diabetes, it must stress interventions that reduce insulin resistance, an integral part of type II diabetes, and aggressively control blood glucose, through earlier diagnosis and improved management of diabetes. That is precisely why exercise and dietary modification will always be the mainstay of diabetic management, because both will improve insulin sensitivity and glucose control. Until recently the only available pharmacologic (sulfonylureas and insulin) interventions in this country for diabetes, poorly controlled with exercise and diet, did not address insulin resistance and were inappropriate for use in early type II diabetes. Not surprisingly, their use has failed to reduce the excessive car vascular morbidity of diabetes, and, indeed, may even be associated with increased risk of cardiovascular disease.

Therefore, the thrust of the medical and pharmaceutical establishment in recent years has been to introduce (e.g., metformin) to this country or develop drugs (e.g., troglitazone) which act directly to reduce insulin resistance, i.e. insulin sensitizers or enhancers, which hopefully may impact more favorably on the cardiovascular complications of diabetes. Unfortunately, these drugs require a prescription and their use in diabetes is markedly delayed, which will likely blunt their efficacy in reducing cardiovascular risk. Indeed, troglitazone was initially indicated in type II diabetes only in combination with insulin, precluding its use in early diabetes.

Accordingly there is a need for a supplement to control the blood sugar by reducing insulin resistance in diabetic and IGT patients, thereby preventing the chronic complications from developing in these high risk patients. There is also a need to provide an effective supplement for the treatment of diabetes and its symptoms prior to the onset of full-blown diabetes.

SUMMARY OF THE INVENTION

The present invention focuses upon a new and unique dietary supplement specifically formulated for people with diabetes and pre-diabetes (IGT). This formulation is based upon well-designed, randomized, placebo-controlled double-blind human studies, using specific minerals and trace minerals, antioxidant vitamins and acetyl salicylic acid in diabetic subjects. The supplement of the present invention includes the precise (both composition and dosage) bioavailable preparations that have been shown in recent human trials to safely improve blood glucose control, insulin sensitivity, lipid abnormalities, blood pressure, and reduce the risk of heart disease in people with diabetes.

Specifically, the present invention provides a daily nutritional supplement for improving glucose metabolism and insulin action comprising an effective amount of a source of chromium, an effective amount of a source of vanadium, an effective amount of a source of magnesium, vitamin E and aspirin, and an effective amount of folic acid and alpha-lipoic acid.

A preferred supplement includes an effective amount of chromium polynicotinate and chromium picolinate as the chromium source, an effective amount of vanadyl sulfate as the vanadium source, an effective amount of magnesium chloride, citrate, fumarate, malate, glutorate and succinate complex as the magnesium source, an effective amount of free 2R, 4'R, 8'R-alpha tocopherol as the natural Vitamin E source, an effective amount of standardized willow bark as the source of aspirin, an effective amount of folic acid and alpha-lipoic acid, as well as sufficient amounts of vitamin and mineral supplements.

The preferred daily dose of these ingredients include between about 200 mcg and about 1500 mg chromium picolinate and/or chromium polynicotinate, between about 10 mg and about 100 mg vanadyl sulfate, and between about 300 mg and about 400 mg magnesium chloride, citrate, fumarate, malate, glutorate and succinate complex, between about 400 I.U. and about 800 I.U. free 2R, 4'R, 8'R-alpha tocopherol, between about 160 mg and about 320 mg standardized willow bark, between about 400 mcg and about 600 mcg folic acid, and between about 0 mg and about 600 mg alpha-lipoic acid. It is recommended that the supplement be taken for a period for at least about 30 days. The most preferred daily nutritional supplement contains about 1000 mcg chromium polynicotinate and/or picolinate, about 100 mg vanadyl sulfate, about 384 mg magnesium chloride, citrate, fumarate, malate, glutorate and succinate complex, about 400 I.U. free 2R, 4'.F, 8'R-alpha tocopherol, about 160 mg standardized willow bark, and about 400 mcg folic acid.

The present invention is related to a unique vitamin, mineral, and herbal supplement for the treatment of both type I and II diabetes, and for the prevention of type II diabetes in those individuals with pre-diabetes, or impaired glucose tolerance (IGT). Specifically, the present invention is directed towards a dietary supplement for diabetic control containing a plurality of compounds from the following group: Vanadyl sulfate, Chromium polynicotinate and picolinate, Magnesium chloride, citrate, fumarate, malate, glutorate, and succinate complex, Natural Vitamin E (free 2R, 4'R, 8'R-alpha tocopherol), Standardized Willow Bark (aspirin), Alpha-lipoic acid, and Folic acid.

The present invention also provides a method for enhancing the natural control of blood glucose levels in a person by daily administration of the nutritional supplement. The daily doses of the anchor or key components listed above, in combination with vitamin and mineral supplements, can be used in patients to prevent the development of full blown diabetes or, where the person has diabetes, to reduce the amount of insulin required to control blood glucose levels.

DETAILED DESCRIPTION OF THE PREFERRED EMBODIMENT

The present invention provides a dietary supplement that enhances glucose metabolism, while treating many of the secondary or risk factors that often accompany diabetes or IGT. While the supplement may be used by individuals with no apparent symptoms of diabetes, the supplement is ideal for use by individuals with IGT and diabetes to prevent, reduce or eliminate the necessity of using insulin or other anti-diabetic medications. However, the supplement contains ingredients which can also work together with insulin to enhance the effect of insulin on the regulation of glucose concentration in the blood by improving metabolism of glucose in the insulin sensitive cells of the body.

Nutritional supplements according to the present invention arc not intended to supplant other forms of diabetes and IGT treatment, such as the appropriate diet and exercise, nor does necessarily it eliminate the need for insulin. Rather, the supplements of the present invention improve glucose metabolism by enhancing the effects of natural or administered levels of insulin and an appropriate diet and exercise program. Through the formulation of the present invention, it has been discovered that a dietary supplement containing effective amounts of metabolically available forms of vanadium, chromium, magnesium, and natural vitamin E in combination with naturally available sources of aspirin, alpha lipoic acid, and folic acid will improve the metabolism of glucose and arrest or treat many of the cardiovascular complications or risk factors associated with diabetes or prediabetes. These components perform different functions which, when administered in appropriate dosages and forms, enhance the metabolism of glucose in substantially the same way as insulin itself, while at the same time prevent or reduce the likelihood of a cardiovascular event due to complications associated with diabetes. The importance of each of these key or "anchor" components is set forth below: Chromium Polynicotinate and Picolinate (Preferred Range 200.00–1,500.00 mcg.; most preferred embodiment 1000 mcg)

There has been much recent hype regarding the benefits of chromium, another trace mineral found in human tissues. Many of the claims surrounding the use of chromium as a supplement, such as weight loss and building muscle mass, are scientifically unfounded, especially in its use for non diabetic individuals. Indeed, chromium supplementation, even in diabetes, is unsettled with the American Diabetes Association's Position Statement declaring, "The only known circumstance in which chromium replacement has any beneficial effect on glycemic, control is for people who are chromium deficient as a result of long-term chromium-deficient parenteral nutrition.

What is certain, however, is that chromium does play a role in both the metabolism of glucose and the action of insulin in the human body. While there is agreement on the need for chromium supplementation in those individuals who are obviously chromium deficient, the actual prevalence of chromium deficiency in people with diabetes has never been, nor could it be, established. Nonetheless, chromium deficiency is common in diabetic patients, who have lower plasma chromium concentrations than nondiabetic controls. It is estimated that up to 90% of Americans fail to consume the minimal daily requirement of 50 micrograms of chromium, and both glucosuria and diets high in refined sugar are known to promote loss of chromium in the urine. In addition, chromium deficiency has been linked to both glucose and lipid abnormalities, and angiographicly proven coronary atherosclerosis.

After several studies using chromium reported a beneficial effect on lipids, chromium picolinate 200 mcg daily for 2 months was given to a group of moderately obese type II diabetic patients in a prospective, placebo-controlled, double-blinded, randomized, crossover trial. While fasting blood glucose and HbAlc levels remained unchanged, there was a significant lowering (17.4%) of triglycerides.

There is a strong dose-response curve to the biologic effect of chromium polynicotinate and chromium picolinate, the most bioavailable preparations of chromium. This is powerfully illustrated by a recent study of 180 type II diabetic subjects randomly divided into three treatment groups: 1) placebo, 2) chromium picolinate 200 mcg daily, and 3) chromium picolinate 1000 mcg daily. While both groups receiving chromium had significant decreases in both fasting and postpranial insulin levels at 2 and 4 months, and significant drop in the 4 month HbAlc level, only the 1000 mcg group had significant reductions in the 2 month HbAlc level, the 2 and 4 month fasting and post-prandial glucose levels, and the 4 month cholesterol level. The beneficial effects of chromium were clearly dose related, with the 1000 mcg dose resulting in greater improvement in glucose metabolism, insulin sensitivity, and cholesterol levels.

Human studies using chromium polynicotinate and picolinate have been characterized by the absence of side effects, even at the higher doses of chromium. Indeed, chromium supplementation in gestational diabetic women was well tolerated and without any apparent untoward effects with doses of 200–500 mcg daily of chromium.

Because of the dose-response curves of chromium nicotinate and chromium picolinate, as well as their superior bioavailability and safety, the present invention will preferably contain 200–1500 mcg., while the most preferred dosage is 1000 mcg.

Vanadyl Sulfate (preferred dosage range 10.00–100.00 mg.; most preferred embodiment is 100.00 mg)

Vanadium, a trace mineral present in human tissue, has a well documented insulin enhancing effect in laboratory animals. After extensive studies using vanadate in diabetic rats, vanadyl sulfate 100 mg daily was found to significantly improve both hepatic and peripheral insulin sensitivity in patients with type II diabetes. Vanadyl sulfate was the preparation of vanadium chosen because it was not associated with any apparent toxicity during treatment periods of up to one year.

In a recently published study of moderately obese, insulin resistant type II diabetic patients, treatment with oral vanadyl sulfate 100 mg daily for three weeks resulted in a significant drop in fasting blood glucose levels and a highly significant reduction in HbAlc levels. In addition, there was a significant lowering of cholesterol and a decline, though not statistically significant, in serum triglycerides. Using the hyperinsulinemic-euglycemic clamp, it was shown that vanadyl sulfate dramatically enhanced insulin mediated glucose disposal with an 82% increase in glucose infusion rate. There was also significant reduction in hepatic glucose production, likely secondary to a potentiation of insulin's inhibitory effect on lipolysis by vanadyl sulfate. As in the previous studies, vanadyl sulfate was well tolerated.

Vanadium's beneficial effect on glucose metabolism appears to be strongly dose dependent. While the use of vanadium is not absolutely necessary to practice the present invention, the preferred dosage range is 10–100 mg.; the most preferred dosage is 100 mg.

Magnesium Chloride, Citrate, Fumarate, Malate, Glutorate and Succinate Complex (preferred range 300–400 mg; most preferred embodiment 384 mg).

Magnesium, rather, magnesium deficiency, has long been known to be associated with diabetes, both type I and type II. Unlike some of the uncertainties regarding the incidence of chromium deficiency in diabetes, much more is known about the epidemiology and diagnosis of magnesium deficiency in diabetes, though discord regarding the actual prevalence of magnesium deficiency abounds. Indeed, magnesium deficiency may be the most underappreciated and underdiagnosed electrolyte abnormality in medicine.

Magnesium is the second most abundant intracellular caution (positively charged element) in the body, predominately in muscle (skeletal and cardiac) and bone. It is a cofactor in over 300 enzymatic reactions and is involved in numerous biochemical functions.

One of these functions is maintaining the activity of the sodium potassium adenine triphosphate (Na—K—ATPase) pump, and deficiency of magnesium, therefore, results in depletion of intracellular potassium (the most abundant intracellular caution) and sodium accumulation. In cardiac muscle, this electrolyte abnormality can cause electrocardiographic changes and cardiac irritability, leading to myocardial infarction and potentially lethal arrhythmias. In addition, magnesium deficiency interferes, with the activity of pumps necessary for calcium-activated potassium channels, resulting in increased free intracellular calcium levels. This has been linked to the Reaven-Modan syndrome and underlies the well-known association of magnesium deficiency to essential hypertension, insulin resistance, hyperinsulinemia, diabetes, congestive heart failure and ischemic heart disease. Also, magnesium deficiency has been associated with an increase in platelet reactivity, a condition known to exist in patients with diabetes, and may help explain the accelerated atherosclerosis and increased rate of acute thrombotic events that so tragically define diabetes. Finally, hypomagnesemia has been implicated in the retinopathic microvascular complication of diabetes, with lower levels of magnesium predicting a greater risk of severe diabetic retinopathy.

While it is universally accepted that magnesium deficiency is common in both type I and type II diabetes, it is unclear as to the precise incidence of this condition in diabetes. The diabetic patient is certainly at risk for developing magnesium depletion via inadequate dietary intake and gastrointestinal and renal losses, especially with poorly controlled blood glucose and resultant glucosuria. However, the diagnosing magnesium deficiency in the clinical setting remains extremely difficult because serum magnesium measures only 0.3% of the total body magnesium, and, therefore, is, at best, a highly insensitive, though very specific, assessment of magnesium depletion in the body. Even with this exceedingly insensitive measure for magnesium deficiency, patients with diabetes have a 25% to 38% prevalence of hypomagnesemia. Using much more sensitive research-oriented tests (nuclear magnetic resonance spectroscopy and magnesium-selective dyes and electrodes) for evaluating the true intracellular magnesium status, it was found that 90% of type II diabetic patients have low levels of free intracellular red blood cell magnesium.

Still, the American Diabetes Association's position on screening, diagnosing and intervening for magnesium deficiency in patients with diabetes remains skeptical, as in the case of chromium deficiency. The inventor of the present invention believes this to be the case because the only currently available means for assessing magnesium depletion in the clinical setting (serum magnesium) is highly insensitive.

Yet, it has now been shown that magnesium supplementation reduces, platelet reactivity in type II diabetic patients, reduces the incidence of congestive heart failure and death in patients with acute myocardial infarction, is associated with reduced systolic and diastolic blood pressure, and improves insulin sensitivity, glucose metabolism and lipid abnormalities in diabetic patients. Magnesium, as used in the present invention, is thus expected to improve glucose metabolism and to arrest or reduce any diabetes associated secondary risk factors.

Many preparations of magnesium are available but they differ greatly in potency, bioavailability (absorption), tolerability, and cost. Magnesium salts, such as the oxide or the carbonate, while inexpensive, are insoluble, poorly absorbed and associated with GI side effects, especially diarrhea. The preferred oral preparation of magnesium is the magnesium chloride, citrate, fumarate and succinate complex because of its solubility, bioavailability, potency, tolerability, safety, and predictability in repleting intracellular and serum levels of magnesium. Therefore, the preferred range of magnesium complex in the present invention is 300–400 mg.; while the most preferred dosage of magnesium complex is believed to be 384 mg.

Vitamin E Natural (free 2R, 4'R, 8'R-alpha tocopherol) (preferred range 400.00–800.00 I.U.; most preferred dosage 400 I.U.)

Vitamin E is the most widely studied of the antioxidant vitamins. The interest in vitamin E as an antioxidant is based on the many demonstrations in humans that giving vitamin E as a supplement decreases the oxidation of low density lipoprotein (LDL) ex vivo, an event critical in the atherogenic process.

Vitamin E supplementation has been shown to significantly reduce experimentally induced atherosclerosis in primates and more recent epidemiological and interventional human studies appear to support this observation. This assumes greater importance in those with diabetes, in view of the fact that as many as 60% of newly diagnosed diabetic patients already have clinically obvious cardiovascular disease.

A significantly lower risk of coronary artery disease was observed in a four year, prospective, observational study in healthy middle-aged men who had higher intakes of dietary vitamin E as compared to those consuming small amounts.

In another prospective, epidemiological study, middle-aged women free of cardiovascular disease at baseline were found to have a highly significant reduced risk of coronary artery disease if they had been on vitamin E supplements for at least two years during the eight year study. In a more recent and similar seven year prospective study of post-menopausal women without cardiovascular disease, dietary vitamin E consumption, but not vitamin A or C, was inversely associated with the risk of death from coronary artery disease.

Perhaps the most powerful argument for vitamin E supplementation, at least, in those patients with already proven coronary artery disease, is the recently published Cambridge Heart Antioxidant Study ("CHAOS"). The CHAOS was a nearly three year prospective, secondary interventional trial of 2002 men and women, 10% of whom had diabetes, using natural vitamin E (free 2R, 4'R, 8'R-alpha tocopherol), 400 or 800 I.U. daily, in a randomized, placebo-controlled, double-blinded design. Either dose of vitamin E was associated with a dramatic and significant 77% risk reduction of non-fatal myocardial infarct. The benefit of treatment with vitamin E was apparent after 200 days, and the patients with diabetes also enjoyed the marked reduction in the risk of non-fatal heart disease.

Another unrelated benefit of vitamin E supplementation is the favorable effect it has on insulin sensitivity, glucose metabolism and lipid levels in both healthy subjects and patients with type II diabetes. Conversely, in a prospective study of almost one thousand non diabetic, middle-aged men, low concentration of plasma vitamin E at baseline was found to be an independent and powerful predictor for the development of type II diabetes during the four year study. Remarkably, a low level of vitamin E was associated with a greater than five-fold risk of developing diabetes in the ensuing four years!

Vitamin E was well tolerated in the studies where it was given as a supplement, and in the CHAOS study there was no difference between the alpha tocopherol treatment (400 or 800 I.U.) or placebo groups for side effects. Because of the unusually high incidence of clinical heart disease in newly diagnosed diabetic patients, and the favorable effect vitamin E has on the metabolic abnormalities of type II diabetes, the present invention will contain preferably 400–800 I.U.; and most preferably natural vitamin E (free 2R, 4'R, 8'R-alpha tocopherol) 400 I.U.

Standardized Willow Bark (preferred range 160.00–320.00 mg.; most preferred dosage 160 mg (20 mg aspirin)).

It is hard to imagine a more cost effective intervention for the prevention of cardiovascular events in either primary (no cardiovascular disease but high risk) or secondary (already have disease) patient groups than acetyl salicylic acid (aspirin). With the exception of successful lifestyle modification, no other treatment modality offers the economic benefits that simple aspirin does. Indeed, it is estimated pharmaceutical costs alone would be reduced by $3 billion per year in this country if the 15 million adults, many with diabetes, who qualify for hypolipidernic medication per NCEP guidelines were to first be given aspirin prophylaxis.

The official American Heart Association and American College of Cardiology guidelines for the care of patients surviving an acute myocardial infarction call for aspirin intervention upon hospital discharge. Yet, given the strong evidence for the benefit of aspirin, a surprising number of patients are not afforded this effective and inexpensive treatment.

The health promoting benefits of aspirin derive from its antiplatelet effect. It works by inhibiting cyclooxygenase, an enzyme necessary for the synthesis of thromboxane, a potent stimulator of platelet aggregation, a condition known to be increased in diabetes and to be causative in the atherosclerotic process. In patients with diabetes, aspirin has been shown to correct this abnormal increase in platelet activity.

The cardiovascular protective effect of aspirin in men and women with diabetes was demonstrated in the Early Treatment Diabetic Retinopathy Study. Both type I and II patients were randomized to double-blinded placebo or aspirin (650 mg per day) and followed-up for at least five years. Aspirin use was associated with a significant reduction in fatal and nonfatal myocardial infarction, and total mortality.

Because aspirin in doses above 80 mg per day may interfere with the synthesis of prostaglandins necessary to protect the gastric mucosa, there is always the risk of gastrointestinal hemorrhage with aspirin use above this dose. Therefore, more recent aspirin trials have used progressively smaller doses to avoid the risk of hemorrhage, and have found comparable suppression of thromboxane with doses as low as 10 mg per day, and with equal or greater risk reduction for cardiovascular end point.

Because the present invention is a dietary supplement, it will contain standardized willow bark, a Chinese herb and a superior, highly standardized, non-drug source of aspirin. The preferred range of standardized willow bark in the present invention is 160–320 mg.; most preferably it is 160 mg (20 mg. aspirin).

Folic Acid (Folate) (preferred range 400–600 meg; most preferred embodiment is 400 mcg).

It is now well recognized that elevated blood homocysteine (a sulfhydryl-containing amino acid) levels are an independent and powerful cardiovascular risk factor.

Homocysteine may injure arterial endothelial cells, affect platelet-endothelial cell interaction, and be thrombogenic. All these effects clearly accelerate the artherogenic process in diabetic patients. High homocysteine can often be normalized by folic acid treatment, which, in patients with elevated homocysteine levels, can reduce arthersclerotic events.

As with other anchor compounds, such as vanadium, the present invention can be practiced in the absence of folic acid, although the present invention will preferably contain 400–600 mcg folic acid, with the most preferred dose of 400 meg.

Alpha Lipoic Acid (preferred dosage range 0–600 mg; most preferred embodiment 50 mg).

Alpha-lipoic acid is one of the most powerful nutritional antioxidants and has long been recognized as a coenzyme needed to break down sugar (glucose) for energy production, thus playing an important role in the metabolism of glucose.

Unique among, the antioxidants, alpha-lipoic acid helps the body recycle and renew other antioxidants, e.g. vitamins C and E, Co-Q1O and glutathione. It also neutralizes both oxygen and nitrogen free radicals, which play major causal roles in cardiovascular diseases.

More recently, it was shown that daily administration of alpha-lipoic acid to diabetic patients with neuropathy significantly reduces symptoms. Diabetic neuropathy has been an unusually refractive complication of diabetes.

The present invention will preferably contain 0–600 mg alpha-lipoic acid (based on the absence or presence of neuropathy), with the most preferred dose of 50 mg.

These anchor compounds are most preferably combined with other vitamin and mineral supplements. These additional ingredients are preferably included with the anchor compounds, and should be taken simultaneously.

These other vitamins and minerals are also important in the metabolism of glucose and may be ingested from food or included in a supplement. In order to be certain that sufficient amounts of the most important minerals and vitamins are available, it is preferred that the supplement also include vitamin A (or beta carotene), vitamin C, calcium, copper, selenium, and zinc.

It should be recognized that the amounts of these vitamins and minerals can vary widely within the scope of the present invention.

One example of the preferred embodiment, the "Pro Health Pak," is distributed by Diabetes Pro Health of Pittsburgh, Pa. Pro Health Pak consists of two major "components." The first, the so-called backbone of the supplement, is comprised of the seven "anchor" compounds used in the human research studies that led to the development of Pro Health Pak and has been discussed in length previously in this application. The second component is a "background" of a standardized, quality controlled multivitamin/mineral formula which obviates the patient's need to take any additional supplements. This "background" was necessary because many Americans, especially those on a restrictive caloric diet, do not eat a well balanced diet.

Each dosage of the Pro Health Pak constitutes a packet containing 4 tablets: (anchor compounds in underline type, background ingredients in regular type)

| | |
|---|---|
| 3 tablets | Containing <u>ChromiumPicolinateandPolynicotinate,Vanadyl Sulfate,VitaminENatural,StandardizedWillowBark(aspirin), FolicAcid,Alpha-LipoicAcid</u> and a Multivitamin/Mineral Formula |
| 1 tablet | Containing <u>MagnesiumComplex</u> consisting of <u>Magnesium Chloride,Citrate,Fumarate,Malate,Glutorate,andSuccinate Complex</u>. |
| 4 tablets TOTAL | |

Specifically, each dose of the Pro Health Pak contains the following:

| | |
|---|---|
| Chromium Polynicotinate and Picolinate | 200–1500 mcg. |
| Vanadyl Sulfate Hydrate | 10–100 mg. |
| Vitamin E Natural (free 2R, 4'R 8'R-alpha tocopherol) | 400–800 I.U. |
| Standardized Willow Bark (aspirin 20–40 mg.) | 160–320 mg. |
| Magnesium Chloride, Citrate, II Fumarate, Malate, Glutorate and Succinate Complex | 300–400 mg. |
| Folic Acid (Folate) | 400–600 mcg. |
| Alpha-Lipoic Acid | 0–600 mg. |
| Vitamin A or Beta Carotene | 5000 I.U. or 25,000 I.U. |
| Vitamin C | 60 mg. |
| Thiamine | 3.00 mg. |
| Riboflavin | 3.60 mg. |
| Niacinamide | 20.10 mg. |
| Vitamin B-6 | 23.10 mg. |
| Vitamin B-12 | 48.00 mcg. |
| Biotin | 300 mcg. |
| Pantothenic Acid | 10.00 mg. |
| Calcium | 150 mg. |
| Phosphorus | 115 mg. |
| Iodine | 150 mcg. |
| Zinc | 15.00 mg. |
| Selenium | 60 mcg. |
| Copper | 2.00 mg. |
| Manganese | 11.00 mg. |
| Molybdenum | 75 mcg. |

Because Pro Health Pak is a dietary supplement, it will contain standardized willow barlk, a Chinese herb and a superior, highly standardized, non-drug source of aspirin. In view of the safety and efficacy of very-low dose aspirin, Pro Health Pak will consist of standardized willow bark 160 mg (aspirin 20 mg).

Pro Health Pak is a dietary supplement and should preferably be distributed in Nutrition Packs containing a 30 day supply. The daily supplement is provided as an individual packet in which 4 tablets are enclosed. Diabetes Pro Health provides to the patient with diabetes or prediabetes a readily available and affordable and medically proven addition to their armamentarium for diabetes management, something which has been sorely lacking. Pro Health Pak will be recommended for use in patients with diabetes or prediabetes only as part of a complete diabetes treatment or prevention program, and will require regular blood glucose monitoring when used in the diabetic patient.

Preliminary test results using the Pro Health Pak in over 100 patients with both type I and type II have shown a significant reduction in blood glucose levels, ranging from 30 mg/dl to as much as 115 mg/dl. These reductions have been noted within as little as two weeks from initiating the Pro Health Pak system to as long as a seven to twelve week period. These patients have consistently noted a 19 to 47% drop in their baseline blood sugars following Pro Health Pak treatment, with the average response being about a 30% reduction. Likewise, the HbAlc levels have dropped a full point after just 3 months of Pro Health Pak use, with one patient having an amazing 8 point drop from his baseline HbAlc. Generally, a 15% reduction in baseline HbAlc is being reported, again, after only three months of treatment.

One byproduct of treatment in this study has been the reduction of serum cholesterol. Absolute reductions in serum cholesterol following Pro Health Pak have ranged from 20 to 67 mg/dl with an 11 to 27% decrease from baseline levels.

Yet another benefit has been a drop in patient blood pressure levels. The systolic drop in blood pressure has ranged from 20–30 mmHg, with a 10–22 mmHg drop in diastolic measurements. Overall, there has been an 8–12% drop in blood pressure.

In addition, most of the test patients have noted significant weight loss. The absolute weight loss has ranged from 7–16 pounds, with an 8% loss of total body weight, despite patients not changing their dietary intake following the addition of Pro Health Pak to their treatment program.

Of course, it should be understood that various changes and modifications to the Pro Health Pak described herein will be apparent to those skilled in the art. For instance, the aspirin component of the present invention need not be derived from standardized willow bark, since some of the benefit sought can be supplied by acetyl salicylic acid derived from any source. Nor do the advantages and uses of the present invention need to be limited to usage on diabetic patients—other patients can easily benefit from the advantages offered by the unique combination of minerals, herbs and vitamins offered by the dietary supplement. Such changes and modifications to the use and design of the present invention can be made without departing from its the spirit and scope and without diminishing its attendant advantages. It is, therefore, intended that all such changes and modifications be covered by the following claims.

I claim:

1. A dietary supplement for improving glucose metabolism, comprising:
    a. a bioavailable source of chromium in amount of at least about 200 mcg;
    b. a bioavailable source of vanadium in amount of at least about 10 mg; and,
    c. a bioavailable source of aspirin in amount of at least about 20 mg of aspirin.

2. The dietary supplement of claim 1, wherein said dietary supplement improves glucose metabolism in a pre-diabetic subject.

3. The dietary supplement of claim 2, wherein daily ingestion of said dietary supplement treats a condition selected from the group consisting of atherosclerosis, heart disease, hyperglyceride, and hypertriglyceride.

4. The dietary supplement of claim 1, wherein said bioavailable source of chromium comprises one or more of the following: chromium picolinate, and chromium polynicotinate; and said bioavailable source of vanadium comprises vanadyl sulfate.

5. The dietary supplement of claim 4, further comprising an effective amount of Vitamin E.

6. The dietary supplement of claim 1, wherein said bioavailable source of chromium is chromium polynicotinate, and said bioavailable source of vanadium is vanadyl sulfate.

7. The dietary supplement of claim 1, wherein said amount of said bioavailable source of chromium has the amount of chromium in about 200 mcg to about 1500 mcg of chromium picolinate, and said amount of said bioavailable source of vanadium has the amount of vanadium in about 10 mg to about 100 mg of vanadyl sulfate.

8. The dietary supplement of claim 7, wherein daily ingestion of said dietary supplement improves a blood level selected from the group consisting of blood glucose levels and HbAlc level.

9. The dietary supplement of claim 7, further comprising an effective amount Vitamin E.

10. The dietary supplement of claim 1, wherein said amount of said bioavailable source of vanadium comprises at least about 100 mg.

11. The dietary supplement of claim 1, wherein said amount of said bioavailable source of vanadium has at least the amount of vanadium in about 100 mg of vanadyl sulfate.

12. The dietary supplement of claim 11, further comprising an effective amount of Vitamin E.

13. An ingestible formulation for improving glucose metabolism in a subject with abnormal glucose metabolism, comprising:
    a. a bioavailable source of chromium in a complex and amount that delivers an effective amount of chromium for improving glucose metabolism; and
    b. a bioavailable source of vanadium in a complex and amount that delivers an effective amount of vanadium for improving glucose metabolism,
    c. a bioavailable source of aspirin in an amount that delivers an effective amount of aspirin,
wherein said amount of said complex of said bioavailable source of chromium is no less than about 200 mcg, said amount of said complex of said bioavailable source of vanadium is no less than about 10 mg, and said amount of said bioavailable source of aspirin is no less than 20 mg of aspirin.

14. The ingestible formulation of claim 13, wherein said subject is pre-diabetic.

15. The ingestible formulation of claim 13, wherein said subject is diabetic.

16. The ingestible formulation of claim 13, further comprising an effective amount of one or more of the following: Vitamin E, and magnesium.

17. The ingestible formulation of claim 13, wherein said complex of said bioavailable source of chromium comprises one or more of the following: chromium picolinate, and chromium polynicotinate; and said complex of said bioavailable source of vanadium comprises vanadyl sulfate.

18. The ingestible formulation of claim 13, wherein said amount of said complex of said bioavailable source of chromium has the amount of chromium in about 200 mcg to about 1500 mcg of chromium picolinate, and said amount of said complex of said bioavailable source of vanadium has the amount of vanadium in about 10 mg to about 100 mg of vanadyl sulfate.

19. The ingestible formulation of claim 18, further comprising an effective amount of one or more of the following: Vitamin E, and magnesium.

20. A method for improving glucose metabolism, comprising administering to a patient a dietary supplement comprising: a bioavailable source of chromium in a complex and amount that delivers an effective amount of chromium, a bioavailable source of vanadium in a complex and amount that delivers an effective amount of vanadium, and a bioavailable source of aspirin in an amount that delivers an effective amount of aspirin, wherein said amount of said complex of said bioavailable source of chromium delivers no less than about 200 mcg, said amount of said complex of said bioavailable source of vanadium delivers no less than about 10 mg, and said amount of said bioavailable source of aspirin delivers no less than about 20 mg of aspirin.

21. The method of claim 20, wherein ingestion of said dietary supplement for at least about two weeks improves blood glucose levels.

22. The method of claim 20, wherein ingestion of said dietary supplement for at least three months improves HbAlc level.

23. The method of claim 20, wherein said patient is pre-diabetic.

24. The method of claim 20, wherein said patient is diabetic.

25. The method of claim 20, wherein said dietary supplement is administered daily.

26. The method of claim 20, wherein said complex of said bioavailable source of chromium comprises one or more of the following: chromium picolinate, and chromium polynicotinate; and said complex of said bioavailable source of vanadium comprises vanadyl sulfate.

27. The method of claim 20, wherein said complex of said bioavailable source of chromium is chromium polynicotinate.

28. The method of claim 20, wherein said amount of said complex of said bioavailable source of chromium delivers the amount of chromium in about 200 mcg to about 1500 mcg of chromium picolinate, and said amount of said complex of said bioavailable source of vanadium delivers the amount of vanadium in about 10 mg to about 100 mg of vanadyl sulfate.

29. The method of claim 28, wherein said amount of said bioavailable source of aspirin delivers about 20 mg to about 40 mg of aspirin.

30. The method of claim 29, wherein said dietary supplement further comprises an effective amount of one or more of the following: Vitamin E, and magnesium.

31. The method of claim 20, wherein said amount of said complex of said bioavailable source of vanadium delivers at least the amount of vanadium in about 100 mg of vanadyl sulfate.

32. The method of claim 31, wherein said dietary supplement further comprises an effective amount of one or more of the following: Vitamin E, and magnesium.

33. The method of claim 32, wherein daily ingestion of said dietary supplement treats a condition selected from the group consisting of atherosclerosis, heart disease, hyperglyceride, and hypertriglyceride.

34. The method of claim 20, wherein said dietary supplement further comprises a bioavailable source of magnesium in a complex and amount that delivers an effective amount of magnesium, wherein said amount of said complex of said bioavailable source of magnesium is no less than about 300 mg.

35. The method of claim 34, wherein said complex of said bioavailable source of magnesium comprises one or more of the following: magnesium chloride; and magnesium citrate, fumurate, malate, glutorate, and succinate complex.

36. The method of claim 29, wherein said dietary supplement further comprises a bioavailable source of magnesium in a complex and amount that delivers an effective amount of magnesium, wherein said amount of said complex of said bioavailable source of magnesium delivers the amount of magnesium in about 300 mg to about 400 mg of magnesium chloride.

37. The method of claim 20, further comprising administering insulin to said patient.

38. The method of claim 20, further comprising monitoring blood glucose levels of said patient with a blood glucose monitor.

39. The method of claim 38, wherein said monitoring is conducted regularly.

* * * * *